(12) United States Patent
Eskandry

(10) Patent No.: US 6,186,321 B1
(45) Date of Patent: *Feb. 13, 2001

(54) COMPACT DISK CASE WITH STACKABLE SLEEVES

(76) Inventor: Ezra D. Eskandry, 1925 Brickell Ave., D901, Miami, FL (US) 33129

( * ) Notice: Under 35 U.S.C. 154(b), the term of this patent shall be extended for 0 days.

This patent is subject to a terminal disclaimer.

(21) Appl. No.: 09/410,844

(22) Filed: Oct. 1, 1999

Related U.S. Application Data

(63) Continuation-in-part of application No. 09/170,442, filed on Oct. 13, 1998, now Pat. No. 6,012,575, which is a continuation of application No. 08/904,399, filed on Jul. 31, 1997, now Pat. No. 5,826,717.

(51) Int. Cl.⁷ .................. B65D 5/57; B60R 7/00
(52) U.S. Cl. ............ 206/308.1; 206/311; 206/425; 224/312; 224/572
(58) Field of Search ............... 206/308.1, 309, 206/311, 312, 425, 472; 40/79, 80 P; 279/312, 572

(56) References Cited

U.S. PATENT DOCUMENTS

| | | | |
|---|---|---|---|
| 903,232 | 11/1908 | Rosenthal | 206/311 |
| 1,186,312 | 6/1916 | Hanselmann | 206/311 |
| 1,275,259 | 8/1918 | Hooker | 206/311 |
| 1,424,778 | 8/1922 | Sea | 206/311 |
| 2,287,365 | 6/1942 | Widder et al. | 206/311 |
| 2,327,324 | 8/1943 | Weiger | 206/311 |
| 2,721,556 | 10/1955 | Delin | 206/311 |
| 4,778,047 | 10/1988 | Lay | 306/311 |
| 4,838,709 | 6/1989 | Guerriero et al. | 206/308.3 |
| 4,844,311 | 7/1989 | Kalen | 224/312 |
| 5,555,977 | 9/1996 | Oshry et al. | 206/308.1 |
| 5,715,937 | 2/1998 | Oshry et al. | 206/308.1 |
| 5,720,384 * | 2/1998 | Wu-Chen | 206/308.1 |
| 5,762,246 | 6/1998 | Drew | 224/312 |
| 5,826,717 | 10/1998 | Eskandry | 206/308.1 |
| 6,012,575 * | 1/2000 | Eskandry | 206/308.1 |

FOREIGN PATENT DOCUMENTS

| | | | |
|---|---|---|---|
| 121579 | 10/1926 | (DE) | 206/311 |
| 1194784 | 11/1959 | (FR) | 206/311 |

* cited by examiner

Primary Examiner—Bryon P. Gehman
(74) Attorney, Agent, or Firm—Robert C. Kain, Jr.; Fleit, Kain

(57) ABSTRACT

The compact disk carrying case includes, in one embodiment, an outer enclosure which is defined by two clam-shell members. Each clam-shell member has an interfacing edge which mates with the corresponding interfacing edge on the other clam-shell member. A mechanism is provided, such as a zipper, for closing the interfacing edges thereby forming a closeable outer enclosure within which is captured a plurality of compact disks. The clam-shell members are hinged together along a portion of each respective interfacing edge. The carrying case includes a plurality of compact disk carrying plates which are grouped together into n pairs of plates by n hinges. Each hinge has a progressively increasing span distance between the respective connected plates. Accordingly, these hinges establish at least a minimum and a maximum span distance between the respective connected plates. The maximum span CD carrying plate hinge is disposed proximate the clam-shell member hinge, any intermediate span plate hinge or hinges (if present) are disposed progressively next to the maximum span plate hinge and the minimum span plate hinge is disposed in an interior region of the compact disk carrying case such that it is adapted to be closed on itself such that its respective connected plates are proximately facing each other when the CD carrying case is closed. The n hinges may be permanently mounted to the clam-shell member hinge or may be removably mounted thereon. In a further modification, the hinged plates may be multiple disk carrying plates wherein disk pouches are overlaid on the multiple disk carrier plate. Preferably, the multiple disk carrier plate pairs have truncated V-shaped edge cut-outs to enable stacking within the outer enclosure.

24 Claims, 9 Drawing Sheets

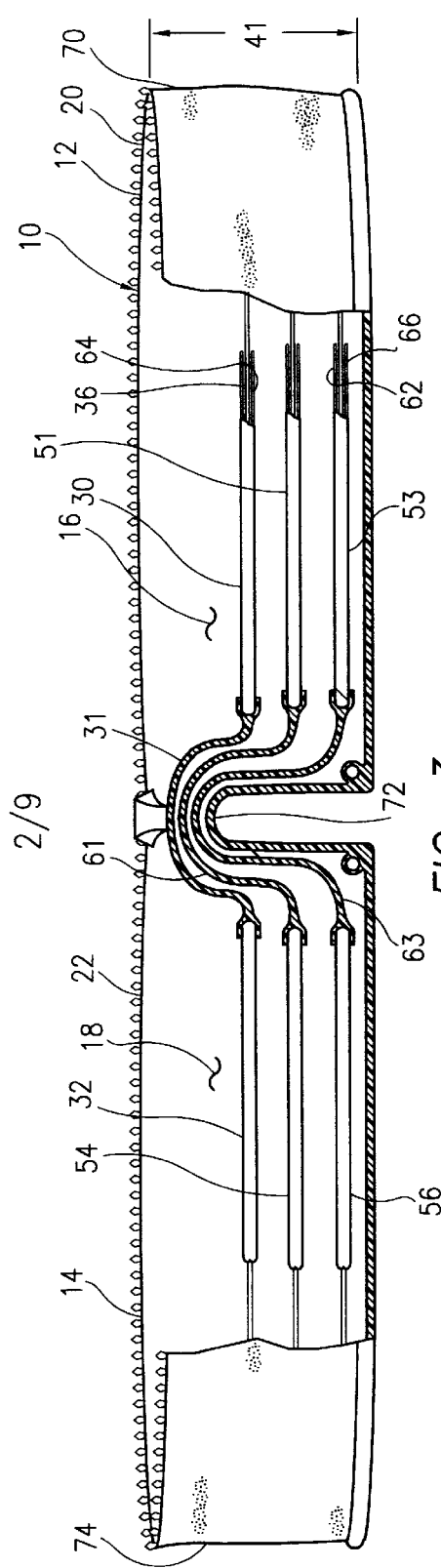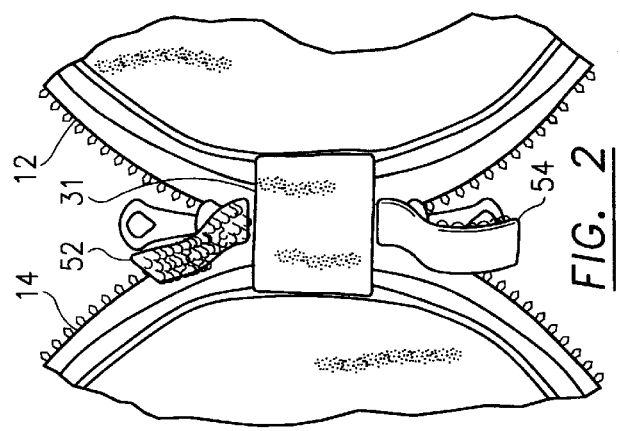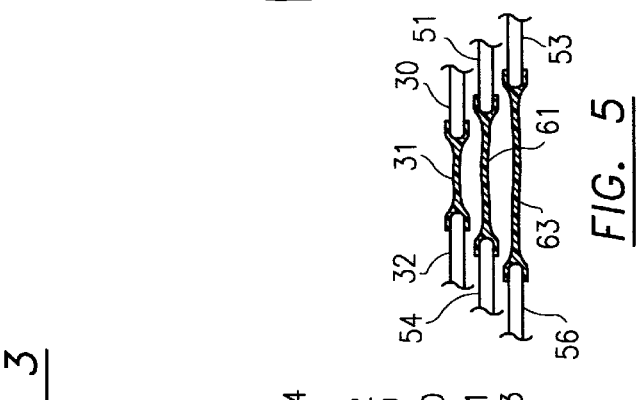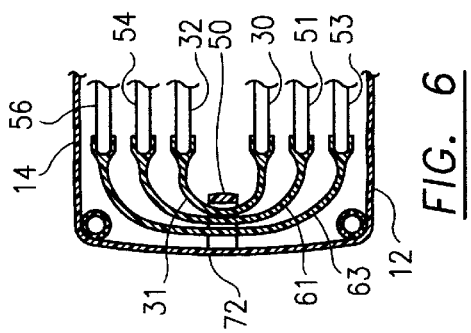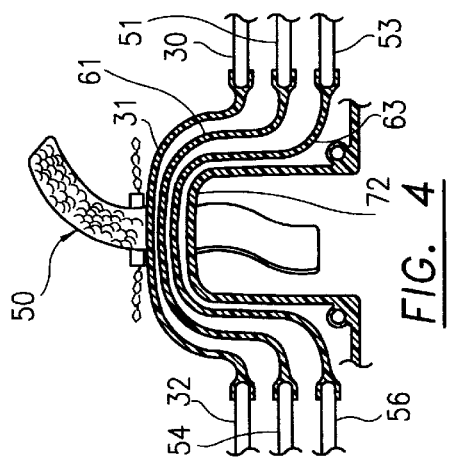

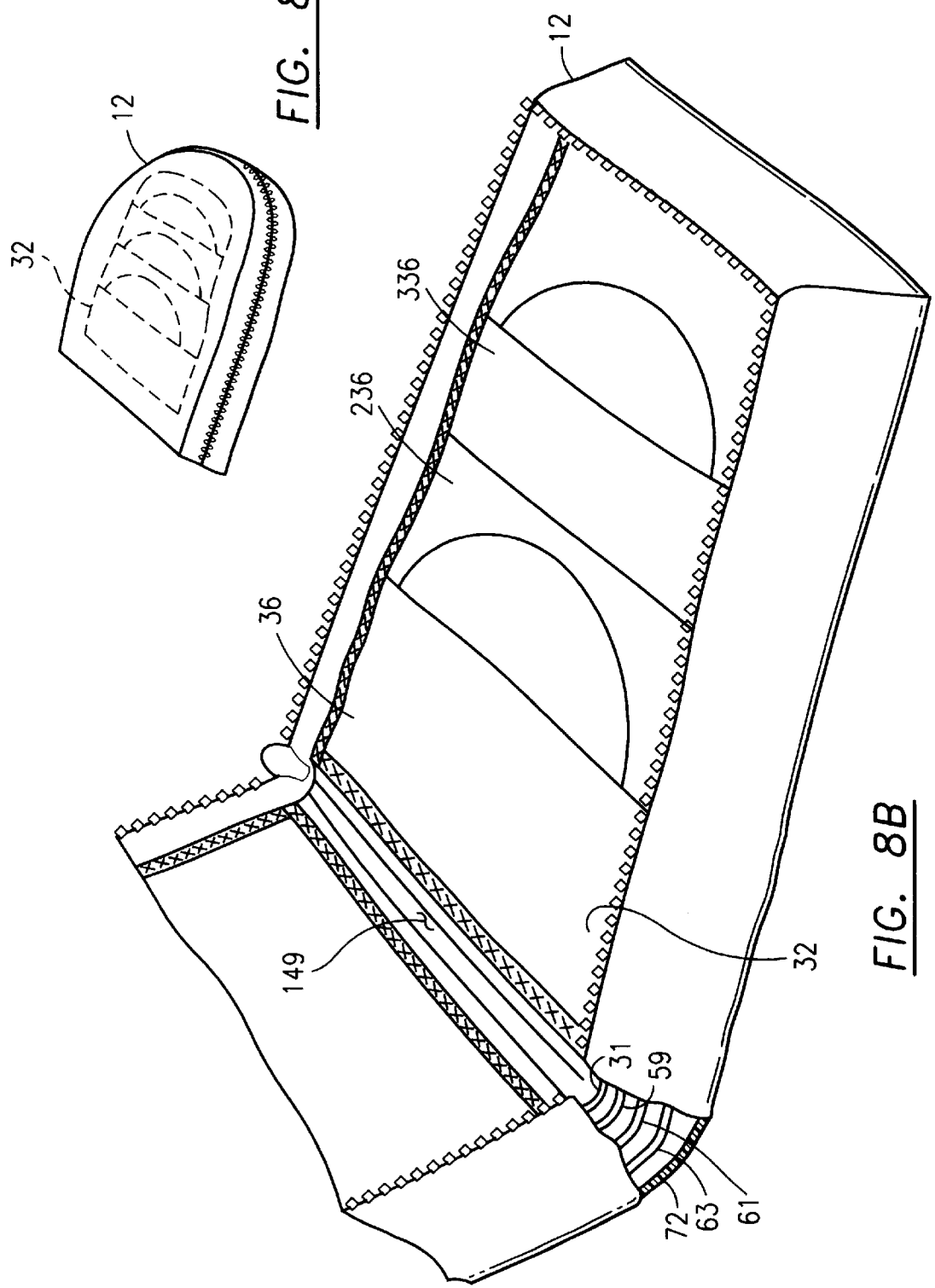

COMPACT DISK CASE WITH STACKABLE SLEEVES

This is a continuation-in-part of patent application Ser. No. 09/170,442, filed Oct. 13, 1998, now U.S. Pat. No. 6,012,575, which was a continuation of U.S. patent application Ser. No. 08/904,399, filed Jul. 31, 1997, now U.S. Pat. No. 5,826,717.

The present invention relates to a compact disk case with stackable sleeves carried in a clam-shell configured outer enclosure.

BACKGROUND OF THE INVENTION

Compact disks or CDs carry audio and computer data. These disks are generally circular, about 4–6 inches in diameter and are very thin plates or platters. Commonly, CDs are made of a plastic type material. Although many CDs are sold in rectangular flat boxes, these boxes are difficult to transport. Accordingly, various types of carrying cases have been developed to hold the circular CD platters.

Some of these CD carrying cases utilize a generally circular plate made of cardboard or other semi-rigid material which is covered by felt or other type of smooth fiber cloth. Commonly, the CDs are inserted into pockets which are formed between the circular plate (covered by the cloth) and a semi circular piece of cloth sewn to a portion of the plate.

OBJECTS OF THE INVENTION

It is an object of the present invention to provide a compact disk carrying case with stackable sleeves.

It is another object of the present invention to provide a carrying case formed by two clam-shell members which close upon each other and capture pairs of disk carrying plates in its interior.

It is another object of the present invention to group these disk carrying plates into pairs wherein each pair is attached by a hinge and each hinge has a progressively increasing span distance between the respective, connected plates.

It is an additional object of the present invention to dispose the pair of disk carrying plates having a maximum span plate hinge near the clam-shell member hinge, to dispose intermediate span plate hinges atop the maximum span hinge and to dispose a minimum span plate hinge in a central location such that the hinge is adapted to be closed on itself such that its respective connected plates are proximately facing each other when both clam-shell members are closed thereby defining a closed compact disk case.

It is another object of the present invention to provide a square shape compact disk carrying case with stackable and removable or stackable and permanently mounted disk carrying plates.

It is a further object of the present invention to provide various mechanisms to remove and/or permanently mount the stackable disk carrying plates in the clam-shell members, each pair of plates having hinges with progressively increasing spans.

It is another object of the present invention to provide a compact disk carrying case with a mesh bag carrier.

It is a further object of the present invention to provide a compact disk carrying case wherein at least one pair of disk carrying plates is adapted to carry a plurality of compact disks.

SUMMARY OF THE INVENTION

The compact disk carrying case includes, in one embodiment, an outer enclosure which is defined by two clam-shell members. Each clam-shell member has an interfacing edge which mates with the corresponding interfacing edge on the other clam-shell member. A mechanism is provided, such as a zipper, for closing the interfacing edges thereby forming a closeable outer enclosure within which is captured a plurality of compact disks. The clam-shell members are hinged together along a portion of each respective interfacing edge. The carrying case includes a plurality of compact disk carrying plates which are grouped together into n pairs of plates by n hinges. Each hinge has a progressively increasing span distance between the respective connected plates. Accordingly, these hinges establish minimum, a least one intermediate and a maximum span distance between the respective connected plates. In use, the maximum span CD carrying plate hinge is disposed proximate the clam-shell member hinge, the intermediate span plate hinge or hinges are disposed progressively next to the maximum span plate hinge and the minimum span plate hinge is disposed in an interior region of the compact disk carrying case such that it is adapted to be closed on itself such that its respective connected plates are proximately facing each other when the CD carrying case is closed. In a further embodiment, the outer enclosure in square shaped. The n hinges may be permanently mounted to the clam-shell member hinge or may be removably mounted thereon. Further, at least one pair of hinged plates may be a pair of multiple disk carrying plates wherein disk pouches are overlaid on the multiple disk carrier plate. Preferably, the multiple disk carrier plate pairs have truncated V-shaped edge cutouts defined at opposite ends of said clam-shell member hinge to enable stacking within the outer enclosure.

BRIEF DESCRIPTION OF THE DRAWINGS

Further objects and advantages of the present invention can be found in the detailed description of the preferred embodiments when taken in conjunction with the accompanying drawings in which:

FIG. 2 diagrammatically illustrates a partial view of the CD carrying case with the overlay locking member open;

FIG. 3 diagrammatically illustrates a partial, broken away view of the CD carrying case showing the plate hinges having different span distances;

FIG. 4 diagrammatically illustrates a detailed view of the plate hinges and the clam-shell member hinge with the overlay locking member;

FIG. 5 diagrammatically illustrates a partial view of a plurality of compact disk carrying plates showing the plate hinges having progressively increasing span distances;

FIG. 6 diagrammatically illustrates a cross-sectional view of a portion of the compact disk carrying case wherein the clam-shell members are closed and showing the positioning of the maximum, intermediate and minimum span plate hinges when the outer enclosure, defined by the two clam-shell members, fully encapsulates the CDs;

FIGS. 8B and 8C diagrammatically illustrate a substantially square or rectangular compact disk carrying case with plates carrying multiple compact disks and an oblong carrying case;

DETAILED DESCRIPTION OF THE PREFERRED EMBODIMENTS

The present invention relates to a compact disk or CD carrying case with stackable sleeves.

Figure 1:
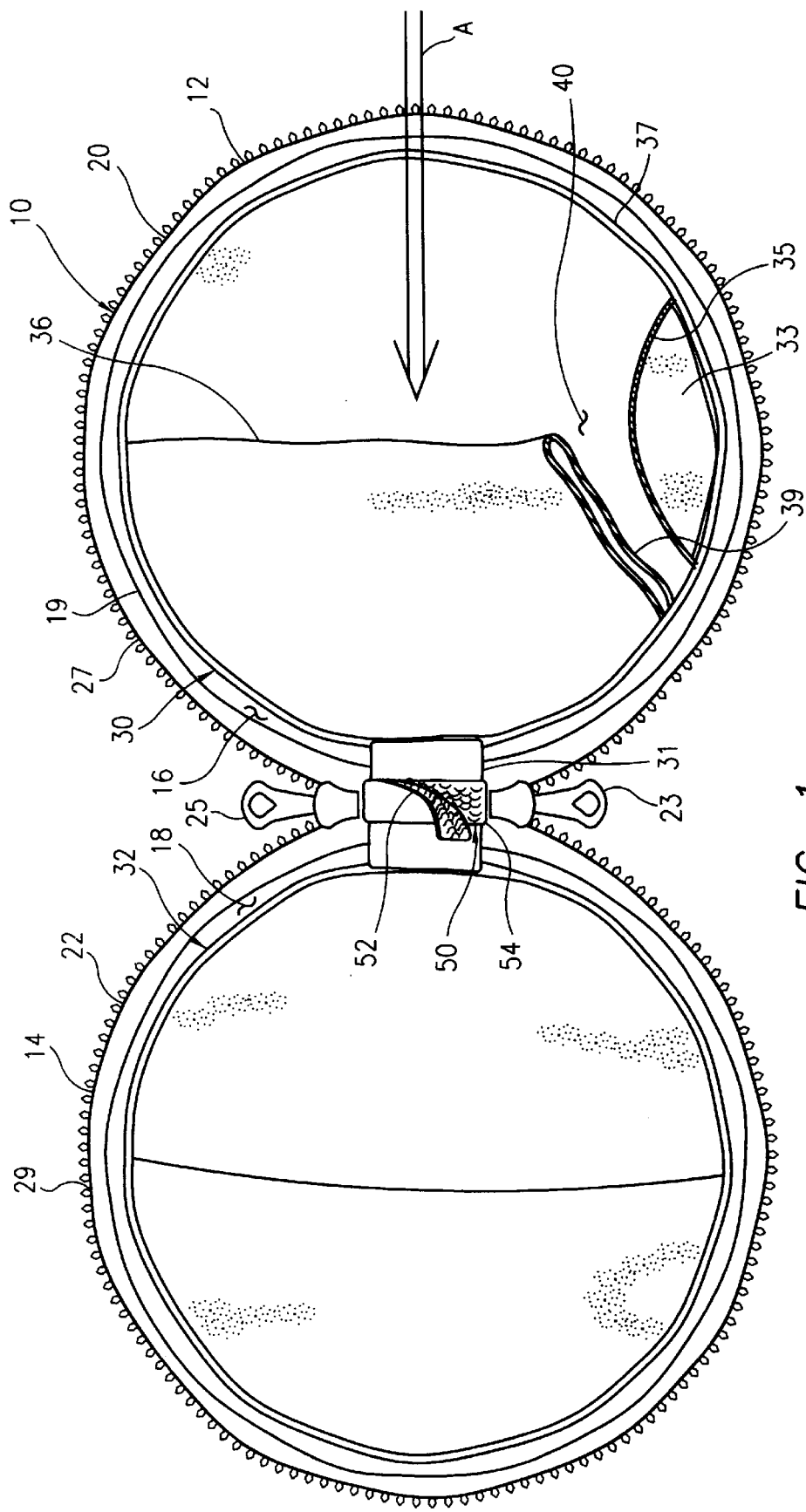
FIG. 1 diagrammatically illustrates the compact disk carrying case in an open position or mode wherein the two clam-shell members fully expose the compact disk carrying plates.
Figure 7:
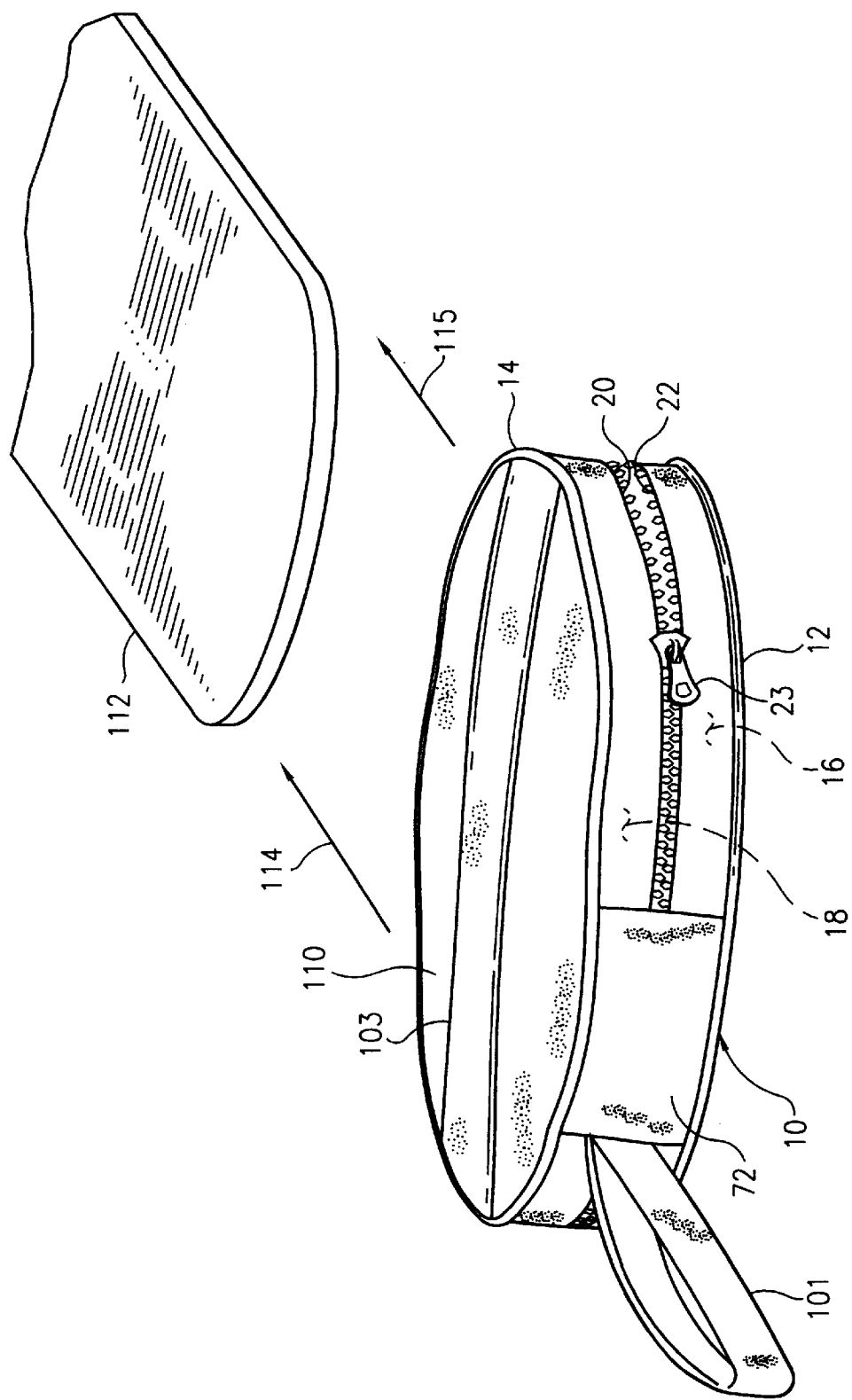
FIG. 7 diagrammatically illustrates the compact disk carrying case when the clam-shell members are partially closed and the interface edges are linked together and further shows the CD carrying case adapted to be inserted on a visor.

FIG. 1 diagrammatically illustrates compact disk carrying case 10 formed by two clam-shell members 12, 14. In FIG. 1, clam-shell members 12, 14 are fully open thereby exposing interior spaces 16, 18 of carrying case 10. In FIG. 7, clam-shell members 12, 14 are fit atop each other so that interfacing edges 20, 22 are adjacent each other. In the closed position or mode, interior spaces 16, 18 defined by clam-shell members 12, 14 combine to form an interior carrying space defined by the outer enclosure. This outer enclosure is defined by the two clam-shell members 12, 14.

Clam-shell members 12, 14 each include an interfacing edge 20, 22. These interfacing edges are linked or closed together by an appropriate mechanism. In the illustrated embodiment, the means for closing includes two zippers 23, 25. However, a single zipper may be utilized. In addition, other types of closing mechanism can be utilized as shown in Table 1.

Table 1

Zippers
Hook and Loop (VELCRO)
Ties
Snaps
Hook and eye
Buttons

In a working embodiment, the compact disk carrying case is made out of nylon and zipper tracks 27, 29 are sewn into the nylon casing as illustrated herein by seam 19 for clam-shell member Each clam-shell member holds a plurality of disk carrying plates (discussed later in connection with FIG. 3). FIG. 1 shows disk carrying plate 30 attached via plate hinge 31 to disk carrying plate 32. In a preferred embodiment, disk carrying plate 30 includes a semi-rigid support plate 33, preferably made of cardboard. A soft cloth covering 35 covers cardboard plate 33. Cloth covering 35 is sewn together with the cloth covering on the back side of the plate along seam 37.

In order to carry a compact disk, the CD carrying plate 30 also includes a pouch 36 defined by a generally semi-circular cloth unit formed by overlapping cloth piece 39. Cloth piece 39 forming pouch 36 is sewn to the other components of the carrying plate 30 along seam 37. Disks are inserted into pouch 36 as shown by arrow A and the disks are captured at least partially in space 40. As discussed later in conjunction with FIG. 3, each disk carrying plate includes both a frontside pouch 36 and a backside pouch (see FIG. 3) such that each plate carries two CDs.

The disk carrying plates are grouped together in pairs and each pair is connected by a hinge, one of which is hinge 31 connecting CD carrying plates 30, 32. Although only six disk carrying plates are illustrated herein (FIG. 3), it should be noted that the CD carrying case can contain a large number of CD carrying plates, in excess of six, dependent upon the height 41 (FIG. 3) of each clam-shell member. Herein, the present invention is discussed in conjunction with six disk carrying plates because it is difficult to illustrate a significantly large number of plates. However, the invention is not limited to such a small carrying case.

In order to secure each pair of disk carrying plates 30, 32 within clam-shell members 12, 14, an overlay locking member 50 is utilized to removably attachment the plate hinges to the carrying case. In the working embodiment, overlay locking member 50 is configured by two strips of attachable cloth carrying hook and loop attachment mechanisms. Accordingly, strip 52 carries, for example, a plurality of hooks and strip 54 carries, for example, a plurality of loops. The hook and loop attachment mechanism is sometimes sold under the trademark VELCRO. Other overlay locking members may be utilized. Table 2 that follows describes some of these locking members.

Table 2

Hook and Loop bearing cloth strips (VELCRO)
Ties
Snap
Hook and eye
Button

FIG. 2 diagrammatically illustrates overlay locking member 50 being open such that locking member 52 is disposed apart from locking member 54. In this manner, plate hinge 31 and the attached respective CD carrying plates can be withdrawn from the outer enclosure defined by clam-shell numbers 12, 14. Since the disk carrying plates can be removed from the enclosure, this enables the user to remove one or more pairs of CD carrying plates and hence the CDs, without removing the entire carrying case. This feature facilitates loading and further distribution of the CD carrying case and CD carrying plate units.

FIG. 3 diagrammatically illustrates a cross-sectional view of six CD carrying plates stored in clam-shell members 12, 14. CD carrying plates 30, 51, 53 are disposed in clam-shell member 12 and CD carrying plates 32, 54 and 56 are disposed in clam-shell member 14. Carrying plates 30,32 are joined together via plate hinge 31, plates 51, 54 are joined together via hinge 61 and plates 53, 56 are joined together via hinge 63. As shown in the partial, broken away view on the right hand side of FIG. 3, CD carrying plates 30, 51 and 53 each include frontside pouches 36 and 62 and backside pouches, two of which are identified as backside pouches 64 and 66. Accordingly, each CD carrying plate 36, 51, 53, 32, 54 and 56, can carry two CDs, one CD in the front pouch and the second CD in the back pouch. Accordingly, although six CD carrying plates are shown in FIG. 3, the carrying case can accommodate up to twelve CDs. As stated earlier, the CD carrying case can accommodate many more than six CD carrying plates dependent upon height 41 of each clam-shell member 12, 14.

Clam-shell member 12 includes side wall 70. Side wall 70 of clam-shell member 12 is attached at a hinge region 72 to side wall member 74 of clam-shell member 14. Stated another way, the local region of interfacing edge 20 of clam-shell member 14 is attached via a clam-shell hinge 72 to interface edge 22 of clam-shell member 14.

FIGS. 3, 4, 5 and 6 show CD carrying plate hinges 31, 61 and 63 having progressively increasing span distances between the respective connected plates 30, 32 and 51, 54 and 53, 56.

FIG. 4 is a detailed view of clam-shell hinge 72 and plate hinges 31, 61 and 63. In addition, overlay locking member 50 is shown in an open mode.

FIG. 5 diagrammatically shows the progressively decreasing span distance maintained by plate hinges 63, 61 and 31 for the respective connected plates 53, 56 and 51, 54 and 30, 32. These progressively decreasing span distances provided by plate hinges 63, 61 and 31, enable the clam-shell members to be closed onto each other and provide for true vertical stacking of the CD carrying plates.

FIG. 6 diagrammatically shows the vertical stacking of the CD carrying plates wherein plate 56 is stacked atop plate 54, plate 32, plate 30, plate 51 and plate 53. The largest or maximum plate hinge 63 links upper and lower CD carrying plates 56, 53. The intermediate hinge 61 provides vertical stackable placement of CD carrying plates 54, 51. Minimum span plate hinge 31 enables that hinge to be closed onto itself such that the respective connected CD carrying plates 30, 32 are proximately facing each other. Overlay locking member 50 captures all of the plate hinges such that the CD carrying plates do not fall out of the enclosure when the clam-shell members 14, 12 are opened. In this illustration, clam-shell hinge 72 is fully open or in a planar position. In FIG. 3, clam-shell hinge 72 is in a closed position when clam-shell member 12 is disposed in the same horizontal plane as clam-shell member 14. The locking member 50 provides a loose, permanently secured loop extending over said hinges and locks each said pair of plates within said outer enclosure. The loop lock permits each pair of plates to move, to some degree, within the enclosure. Alternatively, the hinges 31, 61 and 63 could be permanently attached together. The largest width hinge 63 provides a wrap around binder for the other, less wide hinges. See FIG. 6.

By providing a plurality of plate hinges having different spans, the CD carrying plates can be vertically stacked atop each other. If the plate hinges have the same span, the CD carrying plates would not be stacked vertically atop each other but would be staggered because of the geometric distance between interface edge 12 and the top CD carrying plate 30 as compared with the distance between interface edge 12 and the bottom CD carrying plate 53.

FIG. 7 diagrammatically illustrates carrying case 10 wherein zipper 23 has partially closed interfacing edges 20, 22. In FIG. 7 clam-shell hinge 72 is fully open. In order to enable the user to easily carry the CD carrying case, a loop strap 101 is provided near one side of clam-shell hinge 72. Since the CD carrying case is designed for transportation of CDs in an automobile, the case also includes a strap 103, made of elastic material, that spans the diameter of carrying case 10. In one embodiment CD carrying plates are circular and the clam-shell members are circular. Strap 103 can be lifted from exposed surface 110 of clam-shell member 14 such that case 10 can be slid onto or mounted onto visor 112. Case 10 is mounted on visor 112 by moving the case in the direction shown by arrows 114 and 115 and interposing visor 112 between strap 103 and exposed surface 110 of clam-shell member 14.

Figure 8A:
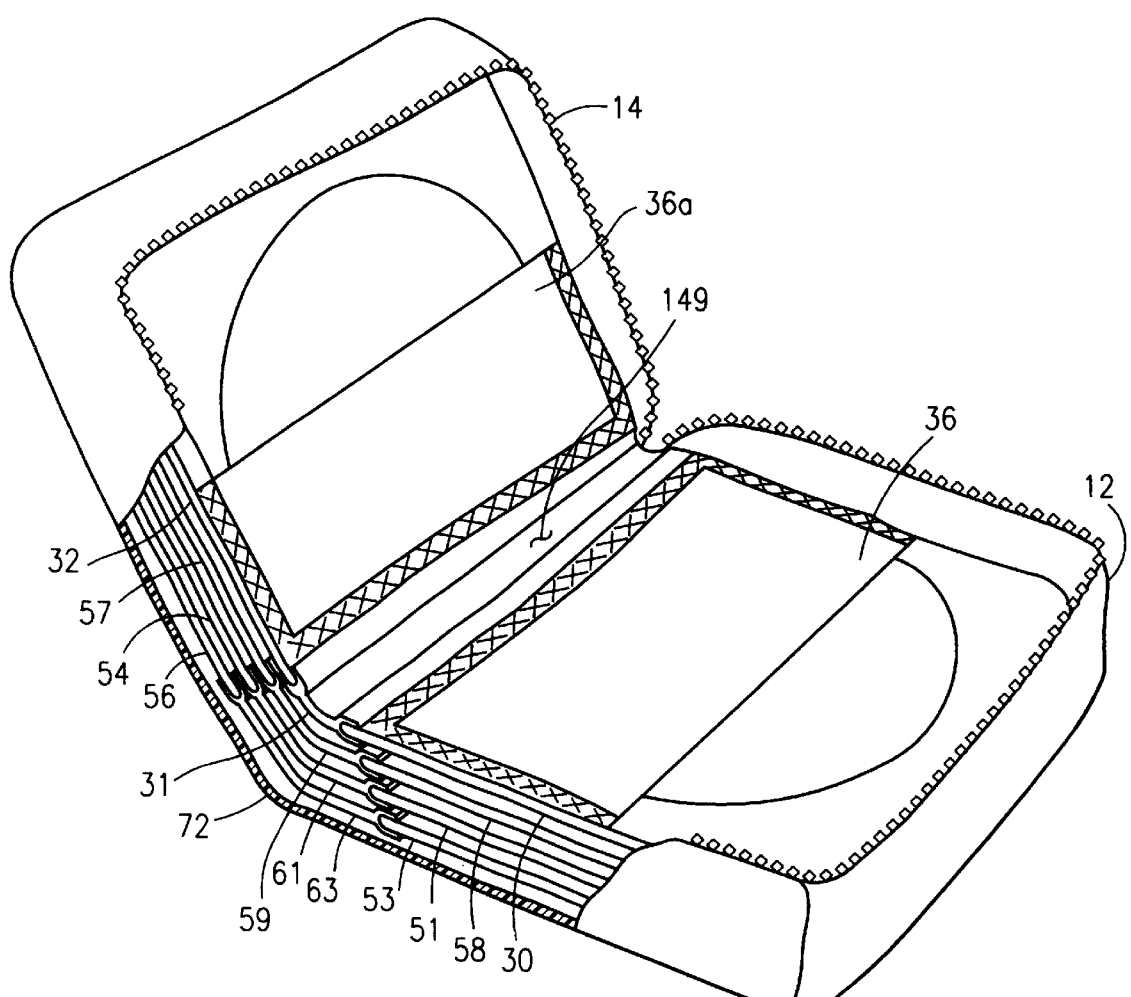
FIG. 8A diagrammatically illustrates a substantially square or rectangular compact disk carrying case.

FIG. 8A diagrammatically illustrates outer enclosures 12, 14 as substantially square shaped or substantially rectangularly shaped. Disposed with an outer enclosures 12, 14 is a plurality of stackable CD carrying pairs of plates. Progressively increasingly longer plate hinges 31, 59, 61 and 63 respectively connect disk carrying plate pairs 30, 32 and 58, 57 and 51, 54 and 53, 56. With respect to the inner most disk carrying plate pair 30, 32, the interior surfaces of those plates have disk retaining pouches 36, 36a within which are disposed CDs.

FIGS. 8B and 8C diagrammatically and respectively illustrate a substantially square or rectangular compact disk carrying case 12 with plates carrying multiple compact disks and an oblong carrying case. In FIG. 8B, disk carrying plate 32 has pouches 36, 236 and 336 which are adapted to carry multiple CDs. The system includes decreasing length hinges 63, 61, 59 and 31. FIG. 8C shows case 12 as an oblong case with a complementary shaped CD carrier plate 32 therein.

FIGS. 9–14 diagrammatically illustrate various mechanisms to (a) attach the CD carrying pairs of plates via n plates hinges 63, 61, 59 and 31; and (b) diagrammatically illustrate removably attachable plate hinge mechanisms and systems. These hinge attachment systems can be utilized on the CD carrier case illustrated generally in FIG. 1, FIG. 8 and FIG. 16 in accordance with the principles of the present invention.

The following Hinge Mount Attachment Table provides some exemplary attachment mechanisms utilized in connection with the stackable sleeve CD carrying case.

Hinge Mount Attachment Table snaps

Figure 9:
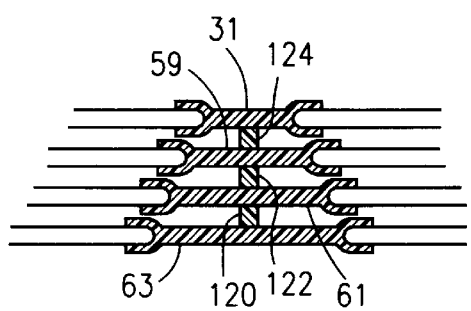
FIGS. 9–14 diagrammatically illustrate various hinge mount attachment systems and removable hinge mount attachment systems for the compact disk carrying case in accordance with the principles of the present invention.

VELCRO (cloth look and loop system)

tightly or loosely sewn single, double or multiple pin or small bolt or clip systems pin, bolt, or clip with spacers sewn with spacers glued or adhered tied with two thin straps extending from opposite lateral sides of the clam-shell hinge interlocking overlay straps which are removably attached via VELCRO, snaps, buttons or holes interwearable with the opposing thin strap FIG. 9 diagrammatically illustrates a hinge mount attachment utilizing spacer bars or inserts 120, 122 and 124 respectively interposed between increasingly larger plate hinges 63,61 and 61, 59 and 59, 31. These spacers may be utilized in connection with the post system described later in connection with FIGS. 12a and 12b, FIG. 13 or permanent sewn or glued or adhered configuration illustrated in FIG. 14.

Figure 10A:
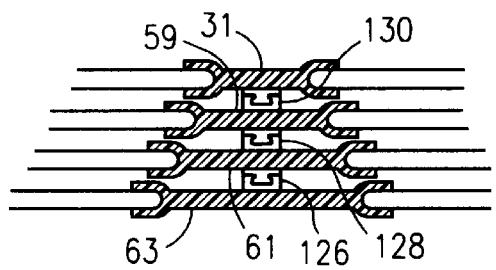
Figure 10B:
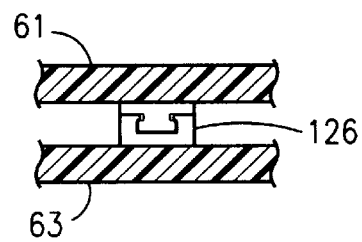

FIGS. 10a and 10b diagrammatically illustrate a snap attachment mechanism consisting of snaps 126, 128 and 130. Snap 126 is interposed between plate hinges 63 and 61. A single snap may be utilized or, and an enhanced embodiment, two or more snaps may be utilized to attach stackable sleeve and adjacent plate hinges 63, 61 together. FIG. 10b diagrammatically illustrates an enlarged view of snap 126 removably attaching plate hinges 63, 61.

Figure 11A:
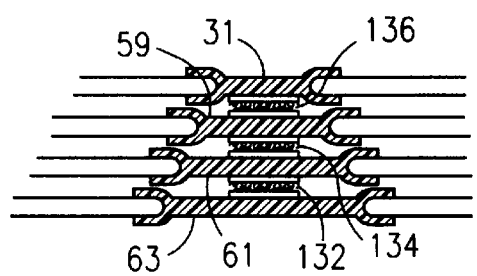
Figure 11B:
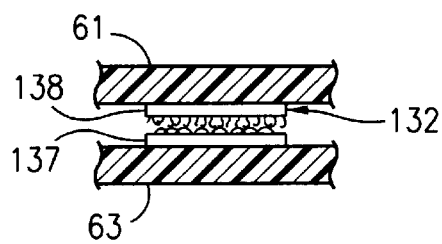

FIG. 11 a diagrammatically illustrates removably attachable system utilizing a cloth hook and loop fastening mechanism (VELCRO fastening mechanism). The hook and loop complementary fastening pair 132 is disposed between plate hinges 63,61. Hook and loop system 134 is interposed between plate hinge 61, 59 and hook and loop attachment system 136 is disposed between plate hinges 59, 31. In FIG. 11b, hook and loop fastening system 132 is shown with loop patch 136 attached to hinge plate 63 and hook patch 138 attached to plate hinge 61. Of course, the hook and loop patches can be interposed on the other faces of the plate hinges.

It should be noted that the removably attachable and stacked disk carrying plates can be attached to each other as well as to clam-shell hinge 72 via the same attachment mechanism listed above and diagrammatically illustrated in FIGS. 9–14 or a different system may be utilized for example, the hook and loop fastener of attachment mechanism 137, 138 may be utilized between long span length plate hinge 63 and clam-shell member hinge 72. This hook and loop system may be used in combination with the snap attachment system shown in FIG. 10a. Alternatively, the disk carrying plates and plate hinges can be sewn or glued together except for the larger plate hinge 61 which may be removably attached to clam-shell member hinge 72 via a snap, overlay tie system (discussed above in connection with FIGS. 1 and 2), a snap, a VELCRO or other removable attachment mechanism listed above in the Table or discussed herein.

Figure 12A:
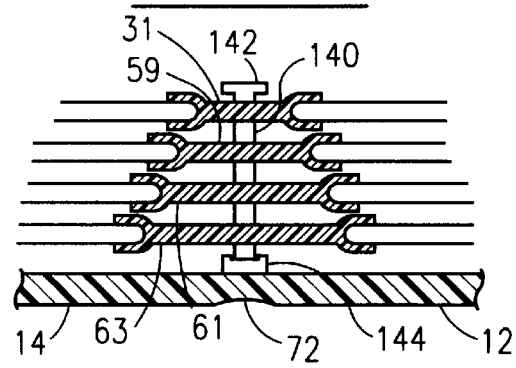

FIG. 12a diagrammatically illustrates a post or bolt attachment mechanism. Post mechanism includes a bolt or post or pole 140 having a bolt or post head 142 adjacent small span plate hinge 31. The opposite end of post or bolt 140 is threadably attached to post end 144. Post end 144 is mounted clam-shell member hinge 72 which provides hinging action between clam-shell outer enclosures 12, 14.

Figure 12B:
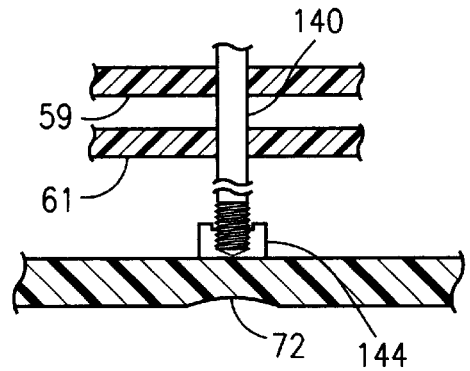

FIG. 12b diagrammatically illustrates post or bolt 140, lower post or bolt fitting 144 and the threadable attachment of the post onto fitting 144. A plurality of posts or bolts 140 may be utilized to removably attach the stackable sleeves into the clam-shell outer enclosures 12, 14. In addition, a lateral bar may span a portion of the clam-shell hinge region. In other words, a lateral bar may span the region identified as region 149 in FIG. 8. Region 149 extends along the length of clamshell member hinge 72.

Figure 13:
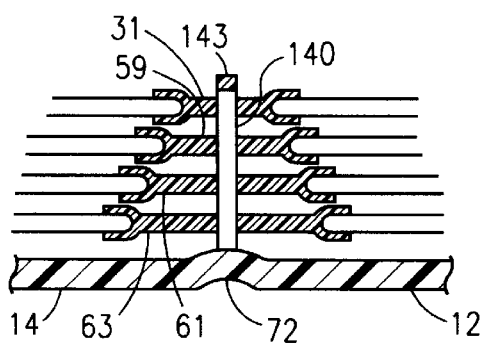

FIG. 13 diagrammatically illustrates a post attachment system 140 with lateral bar 143 (shown in cross-section).

Figure 14:
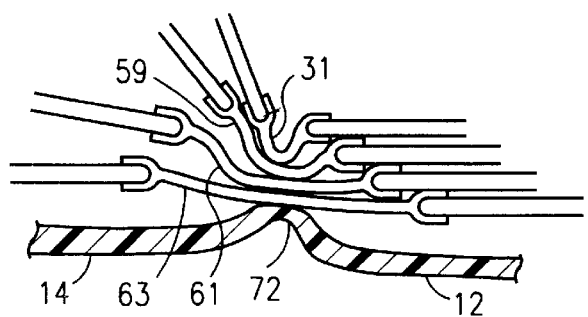

FIG. 14 diagrammatically illustrates the adhesion or sewn (which may be loosely sawn) attachment of plate hinges 61, 63, 59 and 31. In addition, FIG. 14 diagrammatically illustrates a glued, adhered, tightly sewn or loosely sewn attachment of the plate hinges to clam-shell member hinge 72.

Figure 15:
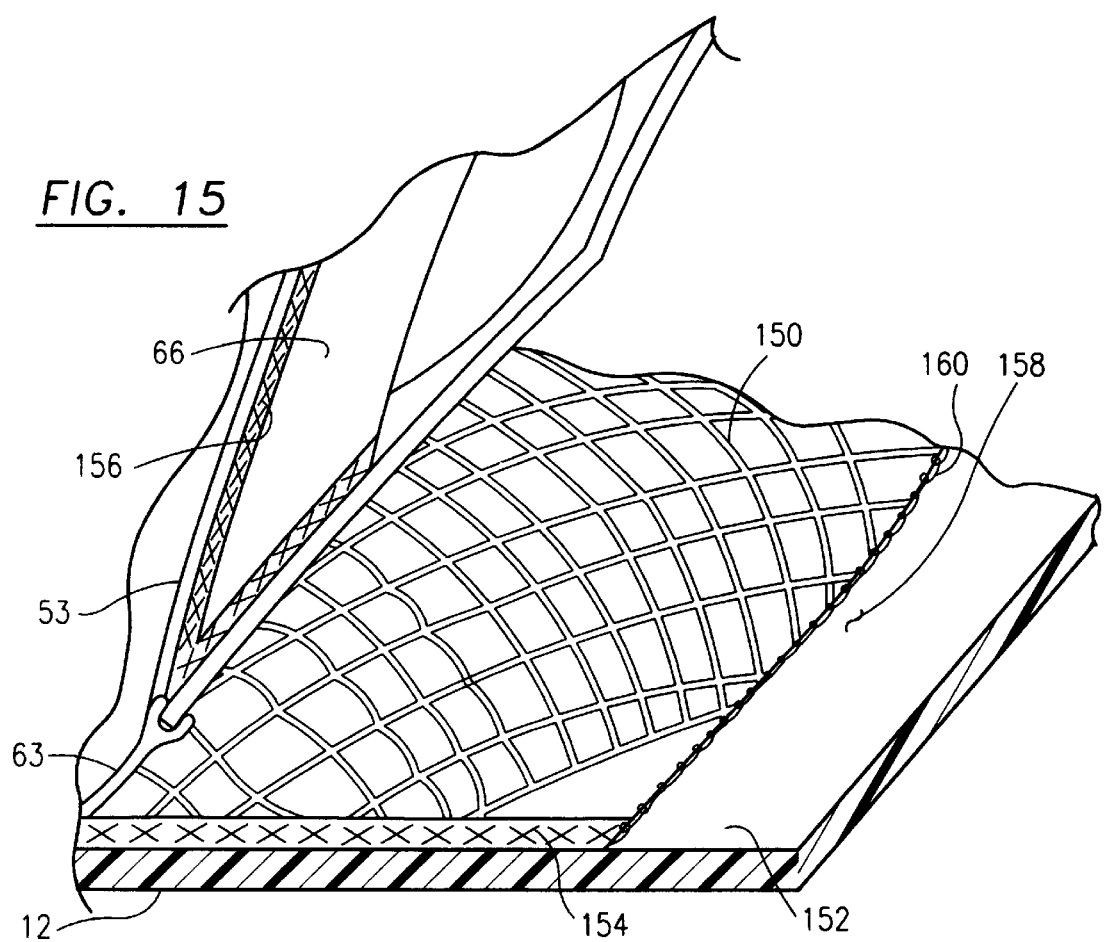
FIG. 15 diagrammatically illustrates a partial, broken way view of an interior portion of a compact disk carrying case and particularly illustrates a mesh pouch.

FIG. 15 diagrammatically illustrates a partial, broken way view of a mesh pouch 150 attached to the interior surface 152 of outer enclosure 12. In the illustrated embodiment, mesh pouch 150 is sewn along periphery 154 to interior surface 152 of outer enclosure 12. A long length plate hinge 63 is partially illustrated attached to disk carrying plate 53. Also illustrated in FIG. 15 is disk cover 66 sewn along periphery 156 to the disk carrying plate 53. Mesh pouch 150 includes an generally open mouth 158 and an elastic member 160 defining mouth 158 of mesh pouch 150. In one preferred embodiment, mesh pouch 150 is attached to interior surface 152 of outer enclosure 12. However, it is possible to mount mesh pouch 150 onto one side of the disk carrying plates.

Figure 16:
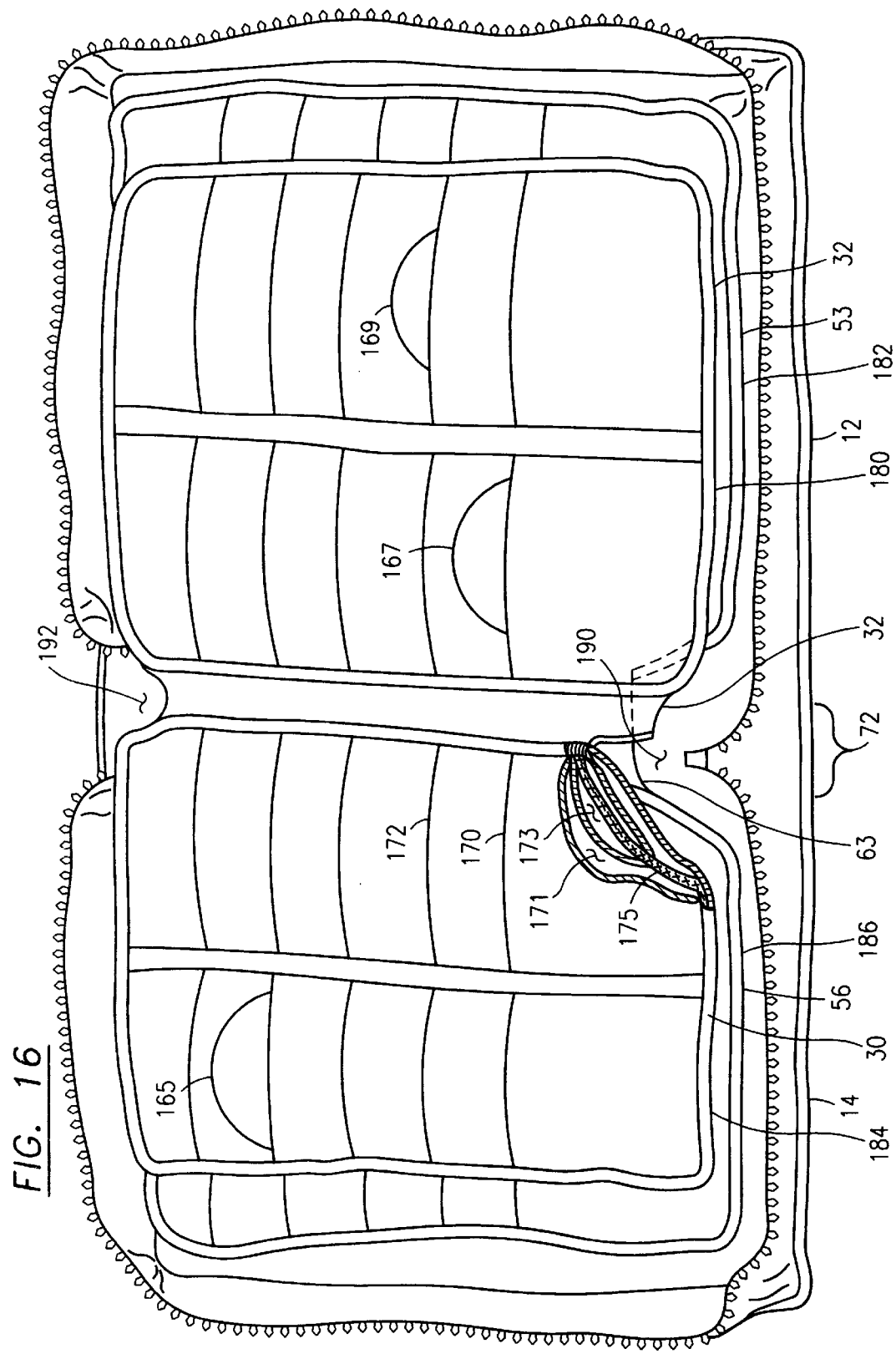
FIG. 16 diagrammatically illustrates a perspective view of a multiple disk carrier with certain portions illustrated as partial, broken way views.

FIG. 16 diagrammatically illustrates a larger square shaped or rectangular shaped outer enclosure 12, 14 and multiple disk carriers disposed in the clam-shell outer enclosures 12, 14. The common features between multiple disk carrier system illustrated in FIG. 16 and the disk carrier system illustrated in FIG. 1 is, among other things, the increasingly larger hinge spans represented by plate hinges 63 and 32. Although two plate hinges are illustrated in FIG. 16, three or more plate hinges, each linking a pair of multiple disk carrier plates, may be utilized in accordance with the principles of the present invention.

Maximum length plate hinge 63 links multiple disk carrier plates 53, 56. Minimum span plate hinge 32 connects multiple disk carrier plates 30, 32. As shown in the partially broken way view of multiple disk carrier plate 30, the plate has staggered and overlaid disk pouches which receive and retain CDs. Particularly, CDs 165, 167 and 169 are disposed in pouch on multiple disk carrying plates 30, 32.

The pouches are overlaid and staggered on the multiple disk carrying plate. As shown with respect to plate 30, CD pouch 170 is overlaid atop CD pouch 172. CD pouch 170 creates CD retaining space 171. Pouch 172, underlaid beneath pouch 170 creates CD retaining space 173. The base plate 175 of multiple disk carrying plate 30 is shown in cross hatch in FIG. 16. Preferably, base plate 175 is made of cardboard or other type of inexpensive, rigid material. Multiple disk carrying plate 30 includes another set of CD carrying pouches on its back side and some of those pouches are diagrammatically illustrated in the partial, broken way view of FIG. 16.

A problem arose in the creation of the multiple disk carrying case illustrated in FIG. 16. The problem involved multiple stacking of a large number of diskss and enabling closure of clam-shell members 12, 14. This "stacking edge" was overcome by utilizing the increasingly larger hinge spans from the inner minimum span hinge 32 to the outboard maximum span or plate hinge 63. Further, a problem was encountered due to the seam 180 on plate 32, seam 182 on plate 53, seam 184 on plate 30 and seam 186 on plate 56. Particularly, the area near clam-shell member hinge 72 had excessive seam material thereat. In order to solve this problem, the disk carrying plates 30, 56 and 32, 53 were modified to include substantially V-shaped cutouts at opposing edge ends 190, 192 of clam-shell member hinge 72.

In order to reduce the material at the hinge region, a truncated V-shaped cutout is utilized for each pair of multiple disk carrying plates 56, 53 and 30, 32. The truncated V-shaped cutouts are truncated to eliminate the apex of the V. Although the term "V-shaped" is used herein, that term includes U-shaped cutouts or V-shaped cutouts with curved truncated apex regions and end regions. These curved end regions are shown for the substantially V-shaped cutouts in FIG. 16. The V-shaped cutouts are complementary in that the angles for each V-shaped cutouts are substantially similar. If imaginary triangles were created for the cutouts on the disk carrying plate pairs 56, 53 and 30, 32, the triangles would be considered complementary triangles. However, the truncated V-shaped cutouts have different sizes. Complementary triangles have substantially similar angles. However, the size of complementary triangles may be radically different. Carrying that structural theory into the present invention, the truncated V-shape for multiple disk carrying plates 56, 53 is much larger than the truncated V-shaped cutout for multiple disk carrying plates 30, 32.

Further, larger size truncated V-shaped cutouts are associated with larger hinge span lengths. For example, maximum span length hinge 63 is associated with a large size truncated V-shaped cutout associated with multiple disk carrying plates 56, 53. With respect to minimum span length of plate hinge 32, a smaller truncated V-shaped cutout is utilized in connection with multiple disk carrying plates 30, 32.

Figure 17:
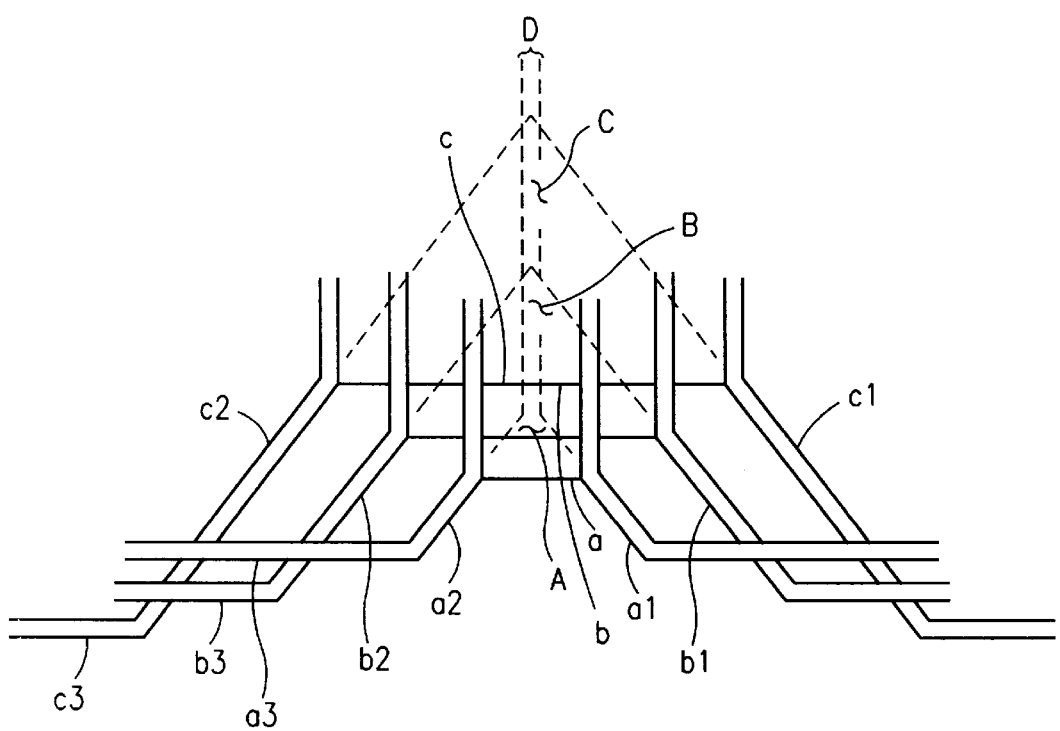
FIG. 17 graphically illustrates the truncated V-shaped cutout configuration, complementary angles and progressively increasing larger sized V-shaped cutouts corresponding to increasingly larger hinge spans for the multiple disk carrier plates.

FIG. 17 graphically illustrates this spatial concept. Small hinge length a is associated with cutout A formed by plate edges or seams a1 and a2. The truncated V-shaped cutout A is illustrated as having an apex falling within central hinge seam D. The attachment mechanisms, both permanent and removable, discussed above in connection with FIGS. 9–14 are utilized in central lateral seam region D.

Intermediate size plate hinge b connects truncated V-shaped and cutout hinges b1 and b2. The truncated V-shaped of that cutout is illustrated as V-shaped cutout B. Maximum length plate hinge c joins plate hinges c1 and c2 and these structural elements form truncated V-shaped cutout C. In this manner, the lateral edges of the disk carrying plates c3, b3 and a3 are displaced laterally with respect to each other and do not create a "bulge" at the seam edge and the CD stackable sleeve. This lateral displacement of seam edges between seam 186 for multiple disk carrying plate 56 and seam 184 for disk carrying plate 30 is shown in FIG. 16. By utilizing increasingly larger truncated V-shaped cutouts, increasingly larger plate hinges (a, b, c) and laterally displacing seam edges c3, b3 and a3, a maximum number of stackable disk carrying plates can be disposed in the clam-shell outer enclosure members 12, 14. Of course, rather than utilizing three pair of multiple disk carrying plates as graphically illustrated in FIG. 17, four or more pair of multiple disk carrying plates can be incorporated utilizing the system.

The claims appended hereto are meant to cover modifications and changes within the scope and spirit of the present invention.

What is claimed is:

1. A carrying case for compact disks comprising:
    an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;
    a plurality of compact disk carrying plates grouped into n pairs of plates by n hinges, each plate having a shape complementary to said outer enclosure;
    each of n hinges which connect a respective pair of said plates together having a progressively increasing longer span which establishes an increasingly longer span distance between said respective connected plates and defining at least a minimum and at least a maximum span hinge length between said respective connected plates; and,
    a maximum length span plate hinge disposed proximate the clam-shell member hinge, a minimum length span plate hinge adapted to be closed on itself such that its respective connected plates are proximally facing when said disk carrying plates are disposed in said outer enclosure.

2. A carrying case as claimed in claim 1 wherein each said disk carrying plate includes at least one front side and at least one back side pouch which are respectively adapted to capture a compact disk therein.

3. A carrying case as claimed in claim 2 wherein each said disk carrying plate includes one front side pouch and one back side pouch and wherein a base section of said front side and said backside pouch is disposed near the respective plate hinge.

4. A carrying case as claimed in claim 1 wherein said clam-shell members are hinged together with a member hinge, the carrying case including means for mounting said n pairs of plates in said outer enclosure via a hinge attachment system, said hinge attachment system including one from the group of an overlay locking member disposed at said member hinge and adapted to be overlaid atop said n hinges when said plates are disposed in said clam-shell members, a plurality of snaps interposed between said n hinges, a post and post cap attachment including at least one post extending from said member hinge to an outboard surface of said minimum length span plate hinge; adhesive bonding layering n hinges and said member hinge; thread attachment linking n hinges and said member hinge; and complementary cloth hook and loop fastener pairs interposed between said n hinges.

5. A carrying case as claimed in claim 4 wherein said hinge attachment system is said overlay locking member means and said overlay locking member means includes a pair of opposing straps, adapted to loop about said n hinges, said overlay locking member means further including an overlay attachment system including one from the group of a complementary cloth hook and loop fastener pair disposed on facing, opposing strap surfaces, snaps disposed on facing, opposing strap surfaces, a tie for said opposing straps, at least one button, holes defined in one of said opposing straps and an interweavable segment established by the other of said opposing straps, a loop on one of said opposing straps and an insertable segment defined on the other of said opposing straps, and a clip attachment for opposing strap ends.

6. A carrying case as claimed in claim 5 wherein each one of said compact disk carrying plates is a multiple disk carrier adapted to carry a plurality of compact disks on a single plate surface thereon, each said multiple disk carrier including multiple pouches on a respective plate surface thereof, each pouch adapted to receive and retain a compact disk therein, and said multiple pouches overlaid and mounted on said respective plate surface of said multiple disk carrier.

7. A carrying case as claimed in claim 1 wherein each of said plates is adapted to carry a plurality of compact disks.

8. A carrying case as claimed in claim 1 wherein each of said clam-shell members includes an interior surface and an exterior surface, a respective interior surface of at least one clam-shell member having a mesh pouch attached thereto.

9. A carrying case as claimed in claim 1 wherein each one of said compact disk carrying plates is a multiple disk carrier adapted to carry a plurality of compact disks on a single plate surface thereon, each said multiple disk carrier including multiple pouches on a respective plate surface thereof, each pouch adapted to receive and retain a compact disk therein, and said multiple pouches overlaid and mounted on said respective plate surface of said multiple disk carrier.

10. A carrying case for compact disks comprising:
    an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;
    a plurality of compact disk carrying plates grouped into n pairs of plates by n hinges, at least one of said compact disk carrying plates is a multiple disk carrier adapted to carry a plurality of compact disks on a single plate surface thereon, said at least one multiple disk carrier including multiple compact disk retaining pouches on a respective plate surface thereof;
    each of n hinges which connect a respective pair of said plates together having a progressively increasing longer span which establishes an increasingly longer span distance between said respective connected plates and defining at least a minimum and at least a maximum span hinge length between said respective connected plates; and, a maximum length span plate hinge disposed proximate the clam-shell member hinge, a minimum length span plate hinge adapted to be closed on itself such that its respective connected plates are proximally facing when said disk carrying plates are disposed in said outer enclosure.

11. A carrying case as claimed in claim 10 wherein said clam-shell members are hinged together with a member hinge, the carrying case including means for mounting said n pairs of plates in said outer enclosure via a hinge attachment system, said hinge attachment system including one from the group of an overlay locking member disposed at said member hinge and adapted to be overlaid atop said n hinges when said plates are disposed in said clam-shell members, a plurality of snaps interposed between said n hinges, a post and post cap attachment including at least one post extending from said member hinge to an outboard surface of said minimum length span plate hinge; adhesive bonding layering n hinges and said member hinge; thread attachment linking n hinges and said member hinge; and complementary cloth hook and loop fastener pairs interposed between said n hinges.

12. A carrying case as claimed in claim 11 wherein said hinge attachment system is said overlay locking member means and said overlay locking member means includes a pair of opposing straps, adapted to loop about said n hinges, said overlay locking member means further including an overlay attachment system including one from the group of a complementary cloth hook and loop fastener pair disposed on facing, opposing strap surfaces, snaps disposed on facing, opposing strap surfaces, a tie for said opposing straps, at least one button, holes defined in one of said opposing straps and an interweavable segment established by the other of said opposing straps, a loop on one of said opposing straps and an insertable segment defined on the other of said opposing straps, and a clip attachment for opposing strap ends.

13. A carrying case as claimed in claim 11 wherein each one of said compact disk carrying plates is a multiple disk carrier adapted to carry a plurality of compact disks on a single plate surface thereon, each said multiple disk carrier including multiple pouches on a respective plate surface thereof, each pouch adapted to receive and retain a compact disk therein, and said multiple pouches overlaid and mounted on said respective plate surface of said multiple disk carrier.

14. A carrying case as claimed in claim 13 wherein each n pair of plates defines a substantially V-shaped cut-out at opposing ends of said means for mounting, said cut-outs being differently sized.

15. A carrying case a- claimed in claim 14 wherein said cut-outs are truncated, substantially V-shaped cut-outs.

16. A carrying case as claimed in claim 15 wherein said truncated, substantially V-shaped cut-outs have complementary angles, but have different sizes.

17. A carrying case as claimed in claim 16 wherein said means for closing is a zipper.

18. A carrying case as claimed in claim 16 wherein said truncated, substantially V-shaped cut-outs on said n pairs of plates have progressively increasing larger sizes which correspond to said increasingly longer span hinges.

19. A carrying case as claimed in claim 10 wherein each of said clam-shell members includes an interior surface and an exterior surface, a respective interior surface of at least one clam-shell member having a mesh pouch attached thereto.

20. A carrying case as claimed in claim 10 wherein each one of said compact disk carrying plates is a multiple disk carrier adapted to carry a plurality of compact disks on a single plate surface thereon, each said multiple disk carrier including multiple pouches on a respective plate surface thereof, each pouch adapted to receive and retain a compact disk therein, and said multiple pouches overlaid and mounted on said respective plate surface of said multiple disk carrier.

21. A carrying case as claimed in claim 10 wherein each one of said compact disk carrying plates is a multiple disk carrier adapted to carry a plurality of compact disks on a single plate surface thereon, and wherein each n pair of plates defines a substantially V-shaped cut-out at opposing ends of said n hinges.

22. A carrying case as claimed in claim 21 wherein said cut-outs are truncated, substantially V-shaped cut-outs.

23. A carrying case as claimed in claim 22 wherein said truncated, substantially V-shaped cut-outs have complementary angles, but have different sizes.

24. A carrying case as claimed in claim 23 wherein said truncated, substantially V-shaped cut-outs on n pairs of plates have progressively increasing larger sizes which correspond to said increasingly longer span hinges.

\* \* \* \* \*